S. C. CARY.
METHOD OF MAKING CORRUGATED FASTENERS.
APPLICATION FILED MAY 15, 1919.
1,372,601.
Patented Mar. 22, 1921.
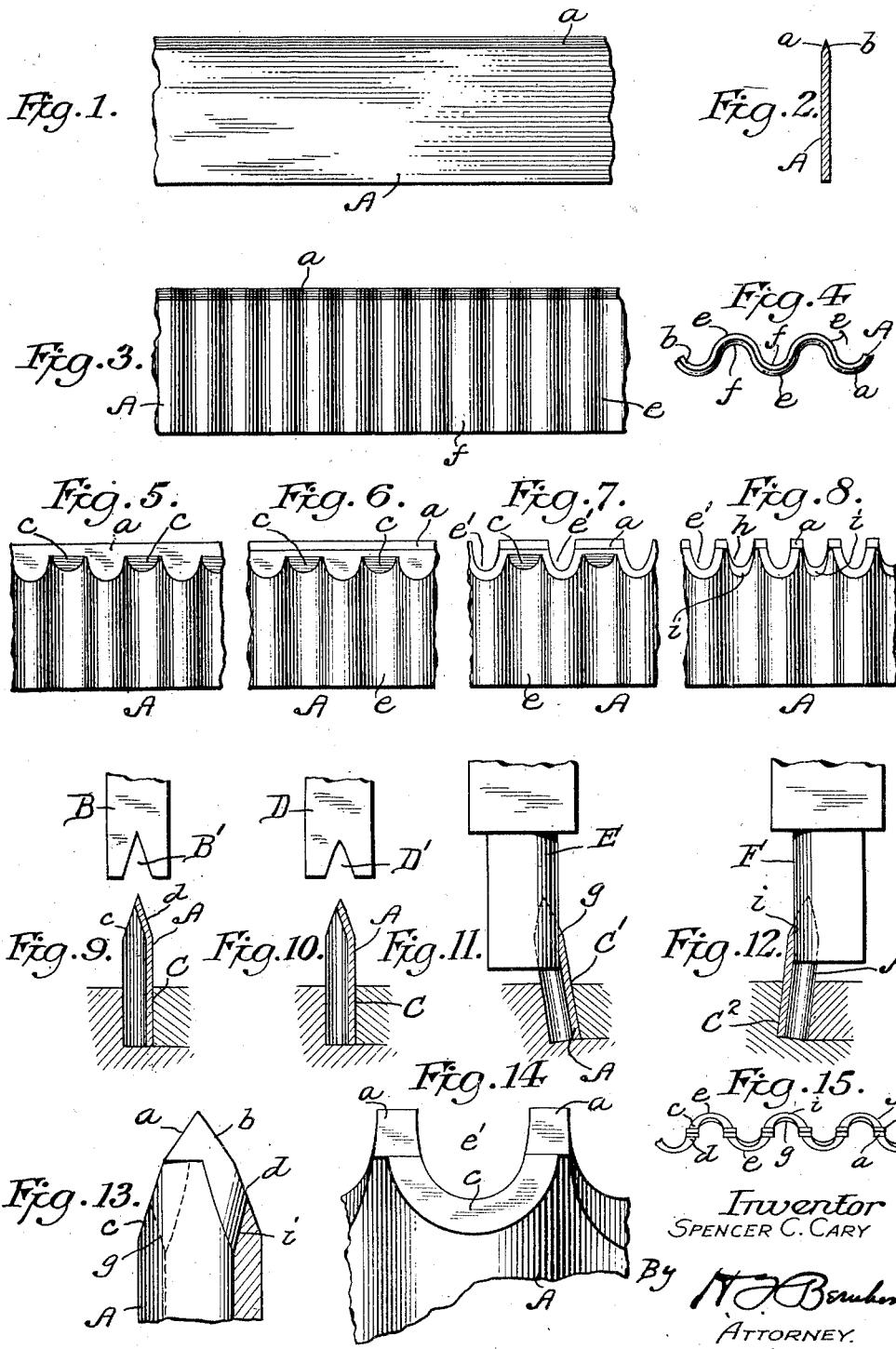

UNITED STATES PATENT OFFICE.

SPENCER C. CARY, OF NEW YORK, N. Y.

METHOD OF MAKING CORRUGATED FASTENERS.

1,372,601.   Specification of Letters Patent.   Patented Mar. 22, 1921.

Application filed May 15, 1919. Serial No. 297,349.

*To all whom it may concern:*

Be it known that I, SPENCER C. CARY, a citizen of the United States, residing at the city of New York, county of Kings, and State of New York, have invented a certain new and useful Method of Making Corrugated Fasteners, of which the following is a specification.

This invention pertains to the art of corrugated fasteners, and, more particularly, to fasteners such as are provided with a saw-toothed formation on the penetrating edge thereof.

Corrugated fasteners are made from hard metal, usually steel of a certain width and gage or thickness, the steel being usually cold rolled to the required width and gage. Difficulty is experienced in securing cold rolled metal suitable for the purpose, it being not unusual for a very considerable variation to exist in the width or in the gage, or both, in the same coil of material. In the manipulation of the cold rolled stock it is corrugated, and thereafter by one mode of procedure or another, the metal along one edge is removed in a manner to result in saw teeth.

The removal of the metal to produce the saw tooth formation is one of the serious problems in the manufacture of fasteners of this type, for the reason that the saw teeth are required to possess sharpened penetrating edges, and such sharpened edges are preferably alined in the plane of the medial line of the fastener, which conditions result in fasteners which will drive easily and straight into the wood, either with the grain or across the grain.

In Patent #1,210,417, granted to me jointly with Herman H. Brand, on Jan. 2, 1917, the corrugated stock is subjected to compression along one edge for the purpose of producing bevels on the convex faces of said stock, and thereafter the corrugated metal is cut out at certain sections to form the saw teeth on said edge of the corrugated metal, said cutting out operation producing, also, bevels in the concave portions of the metal so as to result in practically a continuous cutting edge, and, further, the edges of the teeth are by a swaging action sharpened and positioned in the medial plane of the fastener, the described procedure resulting in a saw tooth fastener embodying the physical form disclosed in Patent 1,295,268, granted to me jointly with Herman H. Brand Feb. 25, 1919.

According to the present invention, the flat metal stock is, prior to the corrugating operation, ground on one edge to produce reversed bevels, the effect of which is threefold, (*a*) to render the stock uniform as to width, (*b*) to require the removal by the cutting operation of a lesser amount of metal than heretofore, and (*c*) to produce the required sharp cutting edges at the points of the teeth. Subsequent to the formation of the bevels on one edge portion of the flat stock, the metal is corrugated, and thereafter it is preferred to swage the corrugated metal on one edge so as to produce the bevels on the convex faces of the stock, and then the swaged metal is cut out to produce the saw tooth formation. The preferred procedure includes, also, the operation of cutting bevels in the concave portions of the stock at the bases of the saw teeth, so as to produce sharpened edges below the points of the saw teeth, and such preferred procedure includes, further, the operation of swaging the previously ground points of the saw teeth so as to further sharpen the points of said teeth and to aline the same in the medial plane of the fastener.

In the drawings,

Figure 1 is a plan view of the flat metal stock one edge portion of which is beveled prior to corrugating the stock, Fig. 2 is a cross section of the same, Fig. 3 is an elevation and Fig. 4 is an edge view of the beveled edge stock after it shall have been corrugated.

Figs. 5, 6, 7 and 8 are views in side elevation of the corrugated metal stock showing the several stages of its manipulation, including the operation of compressing the metal at one edge to produce the bevels on the convex surfaces, swaging the edge to centralize the same, and cutting out the metal at certain parts and on the respective sides of the stock to produce the saw teeth.

Fig. 9 is a sectional elevation illustrative of the procedure in swaging the corrugated metal to produce bevels on the convex surfaces as shown in Fig. 5.

Fig. 10 is a sectional elevation showing the means for swaging the ground edge of the corrugated metal so as to aline the points of the resulting teeth as shown in Fig. 6.

Fig. 11 is a sectional elevation illustrative of the action of one cutting die for removing the metal on one side of the corrugated and swaged stock to attain the condition of Fig. 7.

Fig. 12 is another sectional elevation showing the action of another cutting die upon the opposite side of the metal for completing the manipulation of the stock and producing a strip of fasteners as shown in Fig. 8.

Fig. 13 is a vertical cross section of the corrugated fastener on a greatly enlarged scale showing the formation of one tooth.

Fig. 14 is an enlarged view in side elevation of one of the teeth.

Fig. 15 is a plan view of a strip of corrugated fasteners.

In the production of corrugated fasteners with saw teeth in accordance with this invention, metal suitable for the purpose is employed, the same comprising hard cold rolled metal A of the required width and gage (thickness). The stock is first treated in a suitable manner to produce bevels $a\ b$ upon one edge, said beveling being prior to corrugating said stock. It is preferred to grind the reversed bevels $a$, $b$, upon one edge portion, said grinding operation being easily and quickly performed by an appropriate set of grinding wheels between which the metal stock is run at considerable speed. The grinding of the bevels is performed quite lightly so as to avoid drawing the temper of the metal stock, such light grinding of the stock requiring the removal only of a small amount of metal from each side or face of the stock at one edge thereof. This operation of beveling the edge portion of the flat metal stock is advantageous for several reasons. The preliminary removal of the metal from the edge on which the saw teeth are to be formed reduces the amount of metal required to be cut out in the formation of the saw teeth, thereby resulting in decreased wear upon the cutting dies and allowing the dies to be used for longer periods without re-sharpening. Said grinding of the edge portion reduces the metal stock to a uniform or standard width, thereby compensating for variations in the width due to the rolling of the stock. Again, the edges of the resulting saw teeth are preliminarily sharpened, the bevels $a\ b$ being at a greater angle than the bevels $c$, $d$, on the convex faces of the corrugated metal, as will now be described.

The flat stock with one edge beveled is corrugated by passing it between rolls appropriate for the purpose, see Figs. 3 and 4, producing a length characterized by convex portions $e$ and concave portions $f$, the stock being continuously bent and rebent as in Fig. 4.

The stock is swaged as shown in Fig. 9 to produce the effect of Fig. 5, for which operation a swaging die B with a groove B′ in its lower edge is used, the corrugated metal A being retained in a vertical position within a guideway C. The walls of the groove B′ in the swaging die are at a certain angle to each other, and in the downstroke of the die with the corrugated metal in a vertical stationary position, said die acts upon the convex portions $e\ e$ on one edge of the corrugated metal to produce the bevels $c$, $d$, on the opposite faces or sides of the corrugated metal, said bevels $c\ d$ converging in directions toward the medial line of the corrugated metal and said bevels $c\ d$ being produced only upon the convex portions of the corrugations.

The corrugated metal is now advanced in the guideway C to the position of Fig. 10, below a second swaging die D, the bottom edge portion of which is provided with a groove D′, the walls of which groove D′ are at a different angle to each other than the walls of the groove B′ in the die B. With the metal in a vertical and stationary position, the downstroke of the die D brings the walls of groove D′ into contact with the ground edge portion $a\ b$ of the corrugated metal, the effect of which is to further sharpen the edges of the resulting saw teeth and, also, to position said edges accurately in the plane of the medial line of the corrugated metal, the second swaging operation on the metal acting to accentuate the bevels $a$, $b$, at sharper angles to the bevels $c$, $d$, see Fig. 13.

The corrugated metal is now advanced to the position of Fig. 11 and beneath one cutting die E, it being observed that the metal is moved into a part C′ of the guideway the effect of which is to cant or tilt the corrugated metal at an angle to the path of cutting die E. This die is so fashioned that on the downstroke it acts to notch or cut out at $e'$ (Fig. 7) the metal of the convex portion $e$ on one surface of the corrugated strip, and simultaneously therewith the die acts on the body of the stock in the concave portion $f$ so as to produce in said concave portion a bevel at $g$, see Figs. 11 and 13.

Said corrugated metal is now advanced in the guideway to enter and remain at rest in the section $C^2$ thereof as shown in Fig. 12, said section $C^2$ of the guideway operating to shift the metal so that the angle of presentation of the corrugated metal to the action of a second cutting die F is reversed, it being noted that in Fig. 12 the corrugated metal is presented to the die F at an opposite angle of inclination to the angle of presentation of the metal to die E in Fig. 11. Now, when the die F descends, it acts upon the opposite side or face of the corrugated strip so as to notch or cut out metal at $h$ in the swaged faces $d$ of the convex portions of the corrugation, and simultaneously therewith the die F acts upon the metal in the concave portions f of the corrugations to produce the bevels i in the body of the metal, see Figs. 12 and 13.

From the foregoing description taken in connection with the drawings, particularly Figs. 7, 8, 11 and 12 it is to be noted that the dies E F cut or notch the metal at e' h and on well defined lines in the swaged faces c d of the convex portions e on the corrugated metal so as to produce the saw tooth formation on one edge of said corrugated metal, and simultaneously with said operations of notching or cutting out the metal as stated, the dies E F cut the metal in the concave portions of the corrugated metal and on the respective faces thereof so as to produce the bevels g, i, the effect of which is to produce a substantially continuous cutting edge on the points and sides of the saw teeth.

It is to be noted, further, that in this invention the corrugated metal is not sliced or cut off at an angle upon the convex faces to produce the bevels c, d, forming the saw teeth on one edge of the corrugated metal; but, on the contrary, the convex portions of said corrugated metal are swaged by the die B to compress said convex portions and thereby produce the bevels c d, after which the dies E F act to notch or cut out the swaged portions c d on well defined lines and at the same time to cut the bevels g i in the concave portions, resulting in saw teeth the edges of which are sharpened to present a substantially continuous cutting edge.

Again, the points of the saw teeth are initially sharpened by beveling the flat stock at a, b, and said points are swaged and accurately alined by the action of the die D, the effect of which in connection with the bevels g i is to so sharpen and position the teeth that the resulting fastener drives easily into the wood, either with or across the grain, and said fastener can be driven straight into the wood without appreciable deflection to one side or the other of the line of direction of driving said fastener.

The saw tooth fastener of my invention may be cut into lengths as desired, or a continuous length of said fastener material may be wound into a coil for use in automatic machines.

The method herein described provides for the rapid and economical manufacture of the new fastener. The fastener as an article is free from burs in the spaces intervening the teeth, said fastener being beveled at g, i in the body of the metal stock and producing in the throats between the teeth a cutting edge adapted to penetrate the wood or other material so that the fastener is provided with a sharpened edge at the points of the teeth and with a cutting edge in the spaces between the teeth.

The article comprising a corrugated saw tooth fastener herein shown and described as the product of the method constitutes the subject-matter of a divisional application filed by me December 23, 1920, Serial No. 432,639.

Having thus fully described the invention, what I claim as new and desire to secure by Letters Patent is:

1. In the art of making saw tooth corrugated fasteners, the process which consists in producing bevels upon one edge portion of flat metal stock, thereafter corrugating said metal stock, and subsequently cutting the metal upon one edge of the corrugated stock to produce saw teeth thereon.

2. In the art of making saw tooth corrugated fasteners, the process which consists in producing bevels upon one edge of flat metal stock, thereafter corrugating said stock, then swaging the convex portions of the corrugated stock adjacent the beveled edge thereof to produce other bevels upon the faces of said convex portions, and cutting out or notching the metal in the swaged bevels of said convex portions to produce the saw tooth formation.

3. In the art of making saw tooth corrugated fasteners, the process which consists in producing bevels upon the edge portion of flat metal stock, corrugating said stock and then manipulating the metal next to the beveled edge of the corrugated stock to produce saw teeth the sides of which are at angles greater than the angle of inclination of the bevels first formed upon the flat metal stock.

4. In the art of making saw tooth corrugated fasteners, the process which consists in grinding reversed bevels upon an edge portion of flat metal stock, corrugating said stock, and cutting said stock through and adjacent the beveled edge portion thereof to produce upon the beveled edge a succession of saw teeth the sides of which are beveled at an angle of inclination different from the angle of inclination of the bevels initially produced upon the flat metal stock.

5. In the art of making saw tooth corrugated fasteners, the process which consists in producing bevels upon an edge portion of flat metal stock, corrugating said stock, swaging the convex portions of the corrugated stock adjacent the beveled edge thereof, and notching or cutting out the metal in the swaged convex portions of the stock to produce saw teeth, the sides of which are inclined at a different angle of inclination than the angle of inclination of the bevels initially formed upon the edge portion of the stock in the flat condition thereof.

6. In the art of making saw tooth corrugated fasteners, the process which consists in producing bevels upon one edge portion of flat metal stock, corrugating the stock, swaging the corrugated metal upon the convex portions thereof and adjacent the beveled edge to produce other bevels the angle of inclination of which is different from the angle of inclination of the bevels first produced upon the metal stock in the flat condition thereof, and notching or cutting out the metal in the swaged beveled portions thereof to produce saw teeth on the initially beveled edge of the corrugated metal.

7. In the art of making saw tooth corrugated fasteners, the process which consists in producing bevels upon one edge portion of flat metal stock, corrugating the stock, swaging the corrugated metal upon the convex portions thereof and adjacent the beveled edge to produce other bevels the angle of inclination of which is different from the angle of inclination of the bevels first produced upon the metal stock in the flat condition thereof, and cutting out the metal to produce notches in the swaged beveled portions on the convex faces of the stock to produce saw teeth and simultaneously therewith cutting bevels in the concave portions of the stock at the bases of said saw teeth.

8. In the art of making saw tooth corrugated fasteners, the process which consists in producing bevels upon one edge portion of flat metal stock, corrugating said stock, swaging the convex portions of the corrugated stock adjacent the beveled edge thereof, thereby producing other bevels the angle of inclination of which is different from the angle of inclination of the beveled edge first produced upon the stock in the flat condition thereof, swaging the beveled edge portion of the stock on a line above the bevels produced by the first swaging operation to position the same in the medial plane of the fastener, and cutting or notching the metal in the swaged convex portions of the stock to produce saw teeth and at the same time cutting bevels in the concave portions of the corrugated metal and at the bottoms of the spaces intervening the saw teeth.

In testimony whereof I have hereunto signed my name.

SPENCER C. CARY.